United States Patent
Mueller et al.

(10) Patent No.: US 6,536,239 B1
(45) Date of Patent: Mar. 25, 2003

(54) APPARATUS AND METHOD FOR SHAPING GLASS TUBES WITH MOLDS

(75) Inventors: Peter M. Mueller, Suwanee, GA (US); Ivan Pawlenko, Holland, PA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/497,043

(22) Filed: Feb. 2, 2000

(51) Int. Cl.$^7$ ............................................... C03B 23/04
(52) U.S. Cl. ........................... 65/292; 65/108; 65/109; 65/110; 65/295; 65/299; 65/276; 65/283; 65/323; 65/357; 65/404; 249/98; 249/100; 425/392; 425/403
(58) Field of Search ........................... 65/108, 109, 110, 65/292, 295, 299, 276, 283, 323, 357, 404; 249/98, 100; 425/392, 403

(56) References Cited

U.S. PATENT DOCUMENTS

| | | | |
|---|---|---|---|
| 677,161 A | * | 6/1901 | Wilson et al. |
| 1,591,060 A | * | 7/1926 | Sherrerd |
| 1,649,641 A | * | 11/1927 | Zeiler |
| 2,404,966 A | * | 7/1946 | Kingston |
| 3,128,504 A | * | 4/1964 | Gewecke |

* cited by examiner

Primary Examiner—Michael Colaianni
(74) Attorney, Agent, or Firm—Henry I. Schanzer

(57) ABSTRACT

A mold for shaping the end region and the opening at a selected end of a first, hollow, generally cylindrical, glass tube to enable a second tube, of smaller diameter than the first tube, to be inserted snuggly a first distance within the selected end of the first tube resulting in the two tubes nesting and being self-centered. The mold includes two complementary elongated side pieces having inner side surfaces for, when joined, encircling the periphery of the first tube along a given portion of its selected end region, and an end cap with a cylindrical stub for insertion within the opening of the first tube at its selected end. The two elongated side pieces and the end cap stub are shaped and interact to cause a gradual tapering and narrowing of the inner diameter of the first tube from a first point to a second point along the first tube, where the second point is at the first distance from the selected end of the first tube, and to also cause an enlargement of the inner diameter of the first tube from the second point until the end edge of the first tube. The inner diameter of the first tube at the second point is approximately equal to the inner diameter of the second tube, while the inner diameter of the first tube, between the second point and the end of the tube, is just slightly greater than the outer diameter of the second tube.

35 Claims, 10 Drawing Sheets

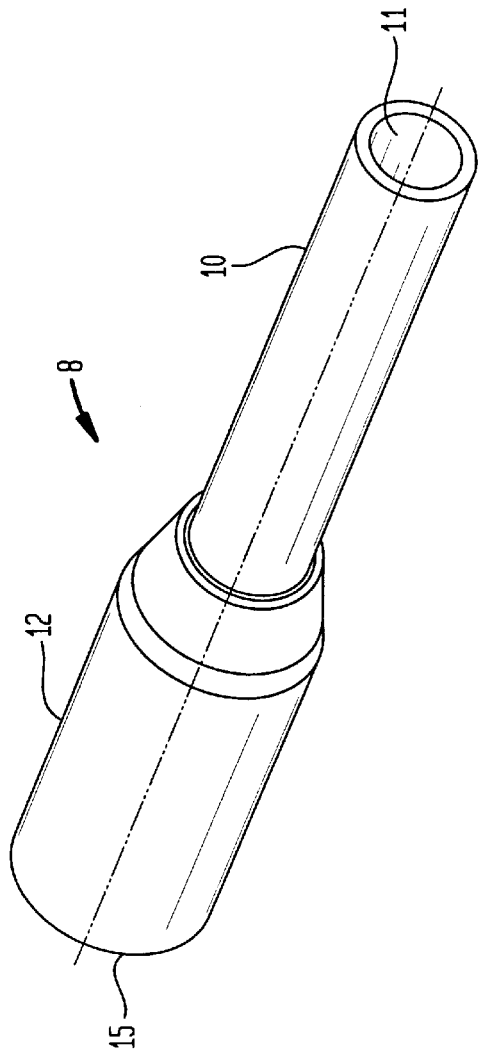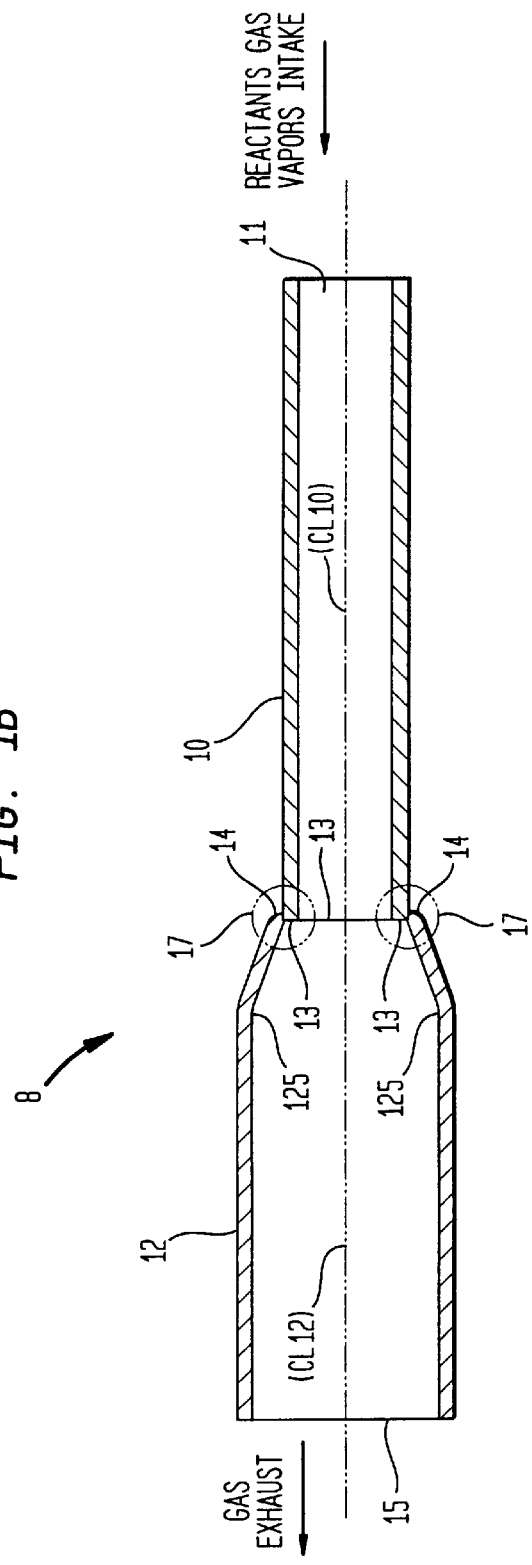

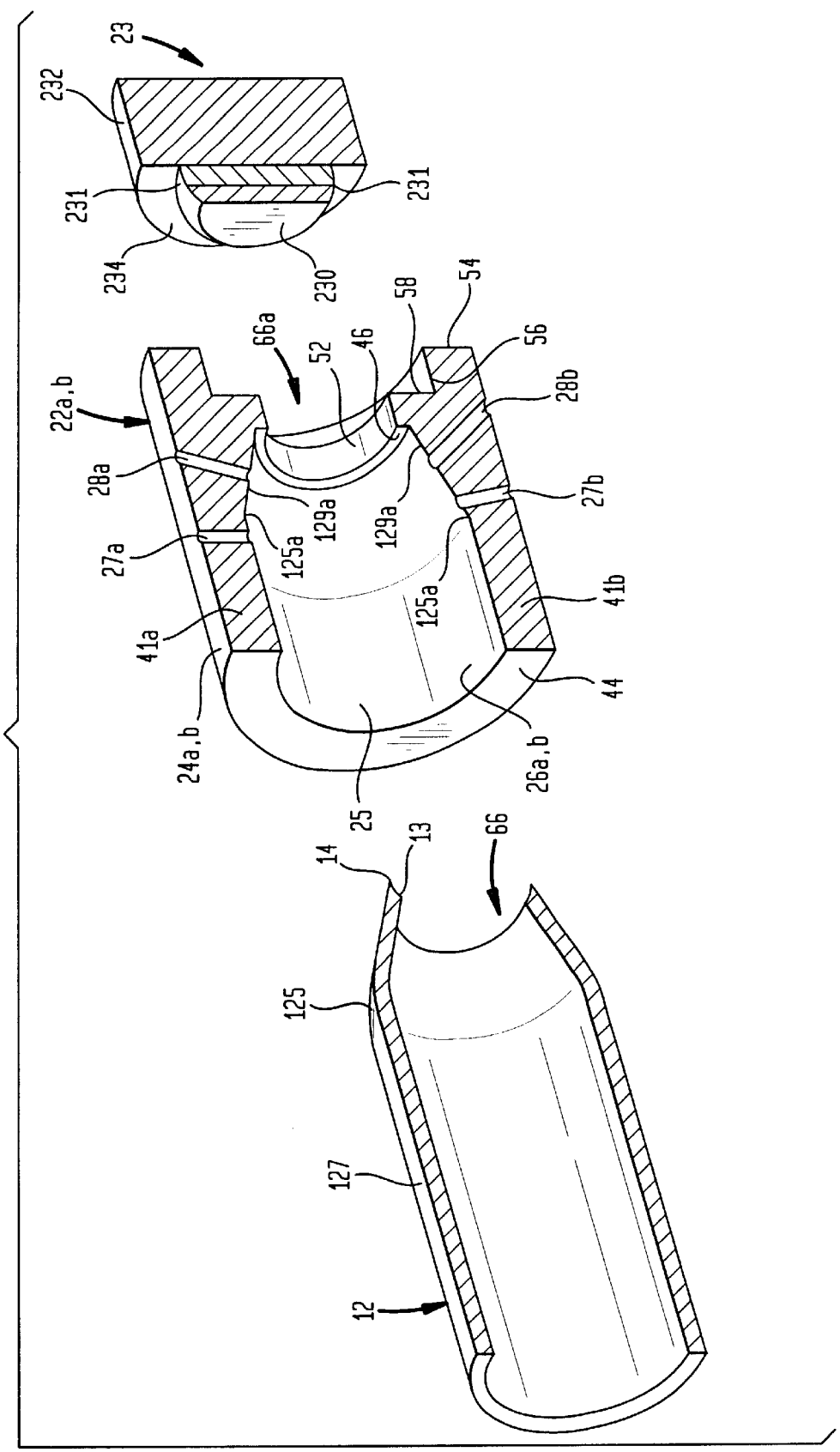

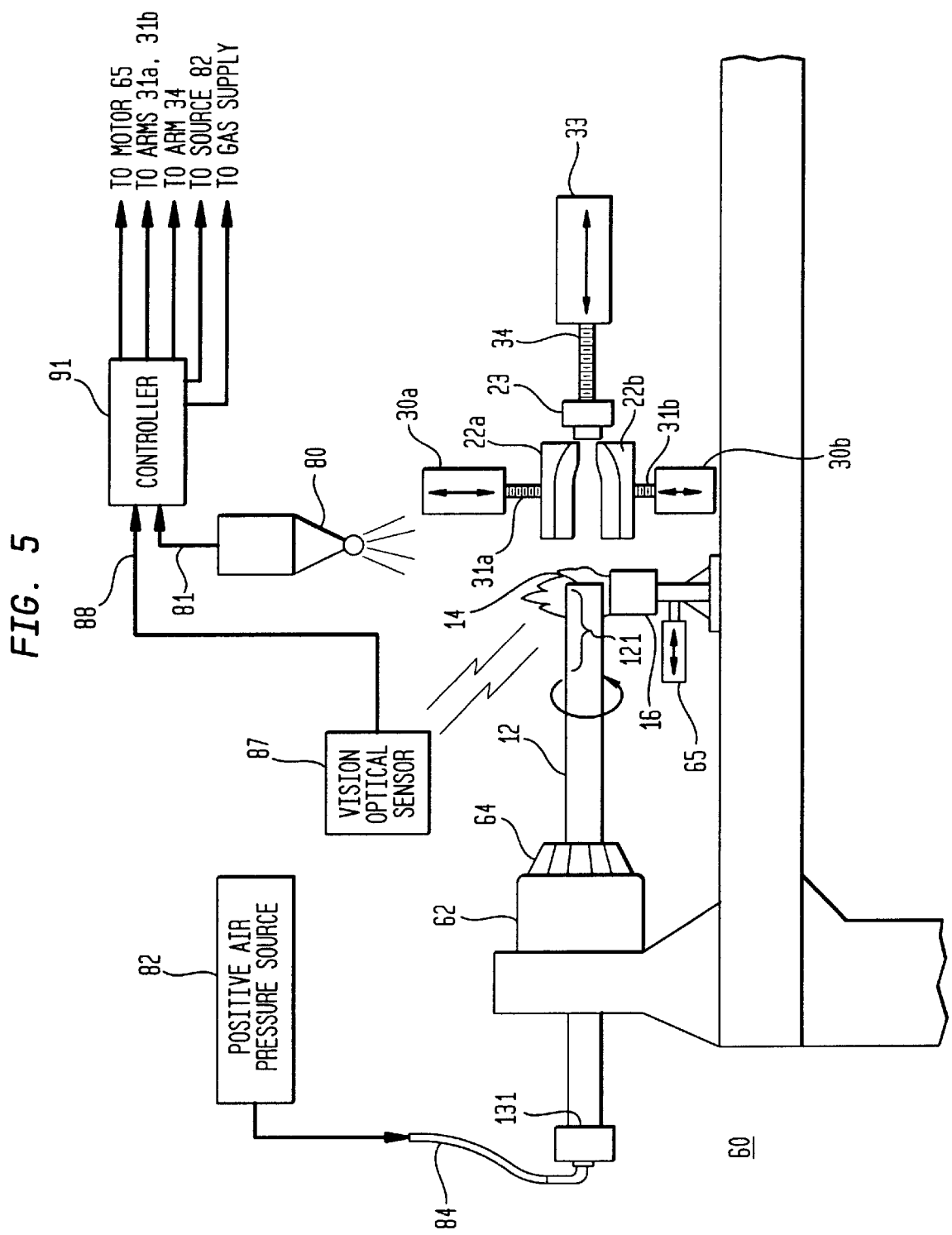

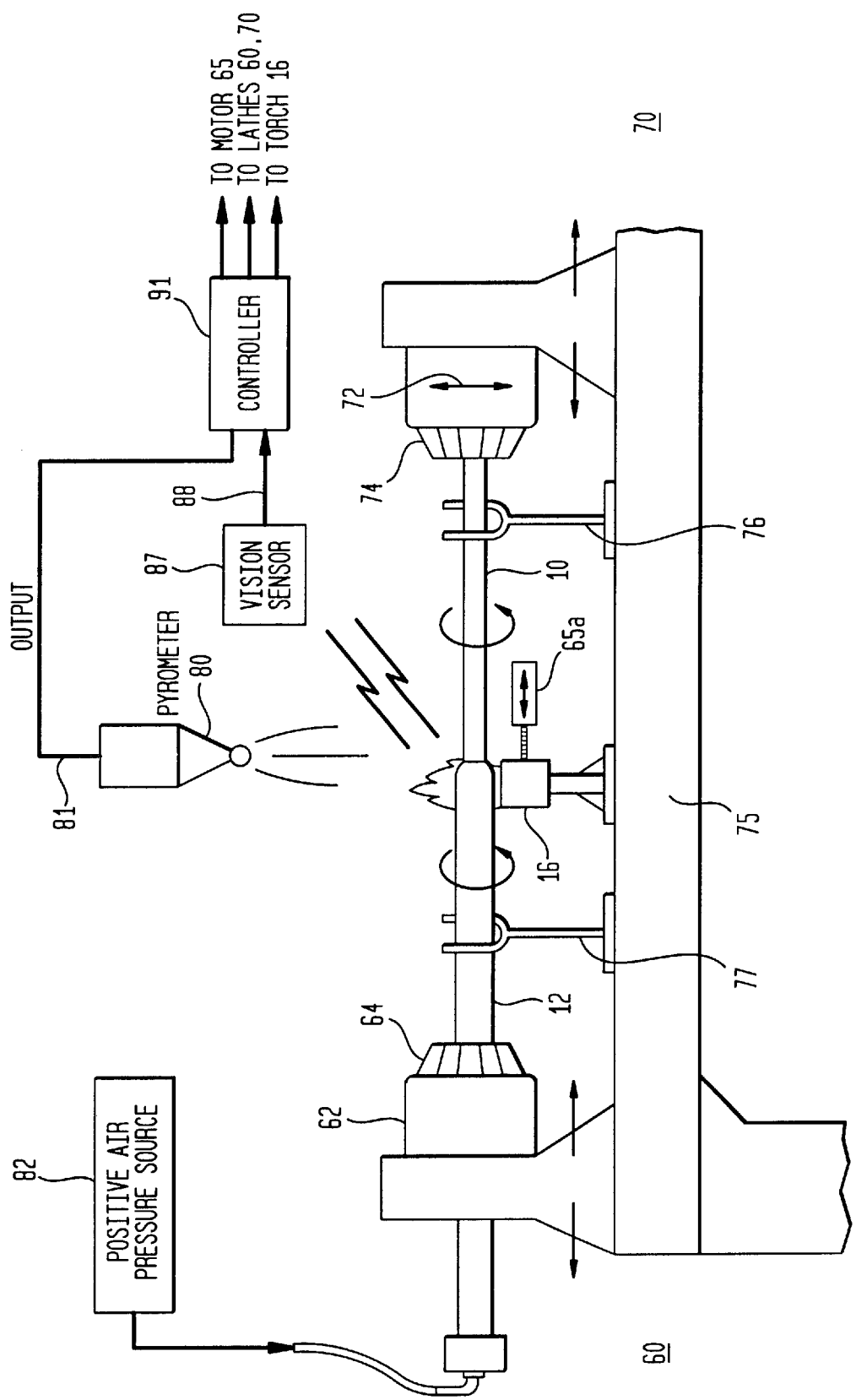

APPARATUS AND METHOD FOR SHAPING GLASS TUBES WITH MOLDS

This invention relates to apparatus and methods for shaping tubes and, in particular, to shaping glass tubes intended for use in the manufacture of optic fibers and for doing so semi-automatically or automatically.

One process for the manufacture of optical fibers is referred to as the modified chemical vapor deposition (MCVD) process in which the internal wall of a glass cylinder (also referred to herein as the "starter tube" or "preform tube") is coated with uniform layers of reactants and gas vapors to form the rod from which the optic fibers are extruded. To ensure the proper and uniform flow of gases within the starter tube, it is desirable to join, or fuse, the starter tube to an exhaust tube prior to initiating the actual fiber optic manufacturing process.

For optimum results the exhaust tube should provide smooth, continuous flow for the gases escaping from the starter tube to, and through, the exhaust tube. To accomplish this result, the exhaust tube must generally have a larger diameter than the starter tube. However, at their interface and mating ends the exhaust tube must mesh smoothly and continuously with the starter tube and must have a profile which aids in the smooth flow of gases out of the starter tube.

It is also noted that each exhaust tube is intended to be joined (or fused) to a starter tube and that the two "combined" tubes are then operated as a unit. Typically, the combined tubes are mounted in an apparatus in which they are made to rotate for many hours while gases and reactants are being injected into the starter tube under intense heat conditions, for forming uniform layers of depositions for the optic fibers. To ensure the formation of consistently uniform layers, it is important that the two tubes be aligned very accurately; (i.e., have a common center line) throughout the process.

In presently known systems the end of an exhaust tube designed to mate with a starter tube is shaped manually using a graphite forming tool, or like manual equipment. This process is an "art" dependent on the skills and techniques of the artisan shaping the mating end and interface of the exhaust tube. This is undesirable and problematic because tubes shaped manually have little uniformity and dimensional reproducibility. As a result, numerous defective exhaust tubes are produced. Equally problematic is that, even when an exhaust tube is not defective, the mating of an exhaust tube with a starter tube is subject to alignment problems.

Thus, there is a dual problem of uniformly shaping and contouring the end of an exhaust tube so that the starter tube (at its mating output) meshes smoothly with the exhaust tube at their common interface and of aligning the two tubes accurately. Clearly, the requirements placed on the manufacture of fiber optics is very demanding and very costly. It may take many hours to produce a fiber optic "preform". Even very small defects, because of their cumulative effect, may result in the loss of much material, energy and time, at great cost to the manufacturer.

Another problem is that in accordance with the prior art when the starter and exhaust tubes are to be joined or fused together, they are cantilevered from spindle chucks. An operator must support the cantilevered tubes by manual means or through the use of a "jack" device and raise or lower the rotating starter and exhaust tubes to achieve co-axial alignment with the end of the exhaust tube. Heat is applied at the support point of the starter tube to stress relieve the starter tube as the operator applies a relocating force to the starter and exhaust tubes. The quality of the co-axiality between the two tubes in this butt-splice technique is a function of the operator's skill. This is undesirable because the quality of the results is unpredictable.

SUMMARY OF THE INVENTION

Applicants' invention is aimed at reducing the problems associated with the shaping of a first tube (e.g., an exhaust tube) which must interface and mate with a second tube (e.g., a starter tube) and ensuring the proper alignment of the two tubes.

In contrast to the prior art technique, the exhaust and starter tubes have a self centering profile, or "nesting" feature. The two tubes are positioned by physical contact with features formed into the tubes themselves. These features are formed on the contact (mating) faces of the tubes. In one embodiment of the invention, the ends of the exhaust tube are molded and shaped to assume a certain configuration, such as a lip, whereby the starter tube "locks" onto the exhaust tube.

One aspect of applicants' invention includes a mold for shaping the opening of a selected end region of a first, hollow, generally cylindrical tube to enable a second tube, of smaller diameter than the first tube, to be inserted "snuggly" a first distance within opening at the selected end of the first tube. In a particular embodiment, the mold includes two, complementary elongated side pieces having inner surfaces for, when joined, encircling the periphery of the first tube along a portion of its selected end region; and an end cap with a cylindrical stub for insertion within the opening of the first tube at its selected end. The two elongated side pieces and the end cap stub are applied to the first tube when the first tube is in a malleable state. The pieces of the mold cause the inner diameter of the tube for a first distance from the end of the tube to have a first value ($d2$) and, at the first distance, to then decrease to a second value ($d1$) and to then gradually and smoothly increase to a third value ($dt2$). In an embodiment of the invention, the tube is a first tube for use as an exhaust tube. The end region and opening of the exhaust tube are shaped to enable a second tube for use as a starter tube, to be snuggly inserted into the opening of the first tube with the two tubes being self centered and being more easily aligned along a common center line.

BRIEF DESCRIPTION OF THE DRAWINGS

In the accompanying figures like reference characters denote like components; and FIG. 1A is an isometric diagram of a starter tube connected to an exhaust tube shaped in accordance with the invention;

FIG. 1B is a cross sectional diagram of the exhaust and starter tubes of FIG. 1A;

FIGS. 4A, 4B and 4C are more detailed cross sectional diagrams of a 3 piece mold embodying the invention for use in shaping an exhaust tube;

FIG. 5 is a simplified diagram of a system for forming an exhaust tube in accordance with the invention;

FIG. 6 is a simplified diagram of a system for joining an exhaust tube with a starter tube to produce a "preform" in accordance with the invention.

DETAILED DESCRIPTION OF THE INVENTION

Figure 2:
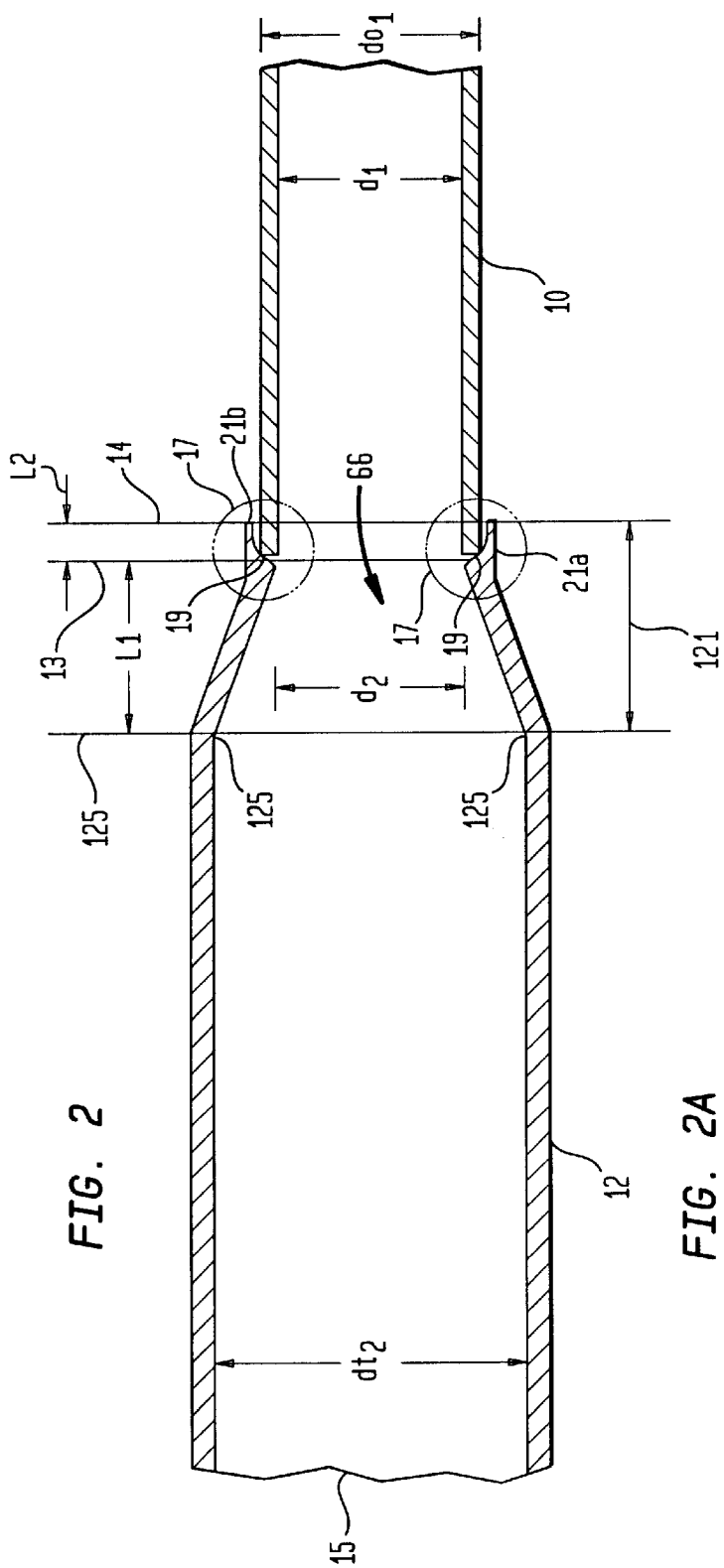
FIG. 2 is a detailed cross sectional diagram of one end of an exhaust tube shaped to enable self-centering with a starter tube in accordance with the invention.

Referring to FIGS. 1A and 1B there is shown an isometric and a cross sectional diagram, respectively, of a "preform" tube 8, where the term "preform", as used herein and in the appended claims, refers to the combined, unitary, structure of a starter tube 10 and an exhaust tube 12. The starter tube 10 is a long cylindrical glass tube in which fiber optic layers are deposited to form the fiber optic strands. The exhaust tube, 12, is also a long cylindrical glass tube having, generally, and for most of its length, a larger diameter than tube 10. Tube 12 is preferably made with a larger diameter than tube 10 so that the gases escaping from tube 10 into tube 12 which get deposited along the inner walls of tube 12, particularly near the interface with tube 10, do not result in a build up which would block the passage of the gases. Also, a smooth transition to an increasing diameter allows for well controlled, more uniform flow of the gases and reactants. Therefore, tube 12 is connected to the starter tube 10 to allow gases to escape from the starter tube in a controlled manner. When the preform 8 is used in the manufacture of optic fibers, reactants and gas vapors are introduced into the end 11 of starter tube 10. The unused gases and vapors escape from the starter tube 10 at the end 13. It is important that the "excess" gases flowing out of the starter tube 10 into the exhaust tube 12 do so with as little turbulence as possible. Reducing turbulence helps ensure that the optic fiber layers are deposited more uniformly within the starter tube. To reduce turbulence, the exhaust tube 12 is preferably designed to have a larger diameter than the starter tube and to present no sharp curves or steps at the starter/exhaust tube interface. Furthermore, it is desirable that the exhaust tube be connected to the starter tube such that its center line (cl12) lies along an extension of the center line (cl10) of the starter tube. This ensures that, when the preform is subsequently mounted in an apparatus to form optic fibers, the preform will rotate uniformly and evenly. The exhaust tube 12 is also designed to have a large diameter than starter tube 10 to ensure that gases escaping from the starter tube and deposited along the inner surfaces of the exhaust tube do not unduly narrow the path for the escaping gases.

Figure 2A:
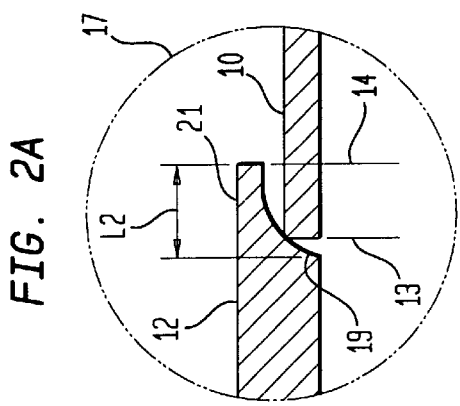
FIG. 2A is an enlarged view detailing the end section of an exhaust tube embodying the invention.
Figure 2B:
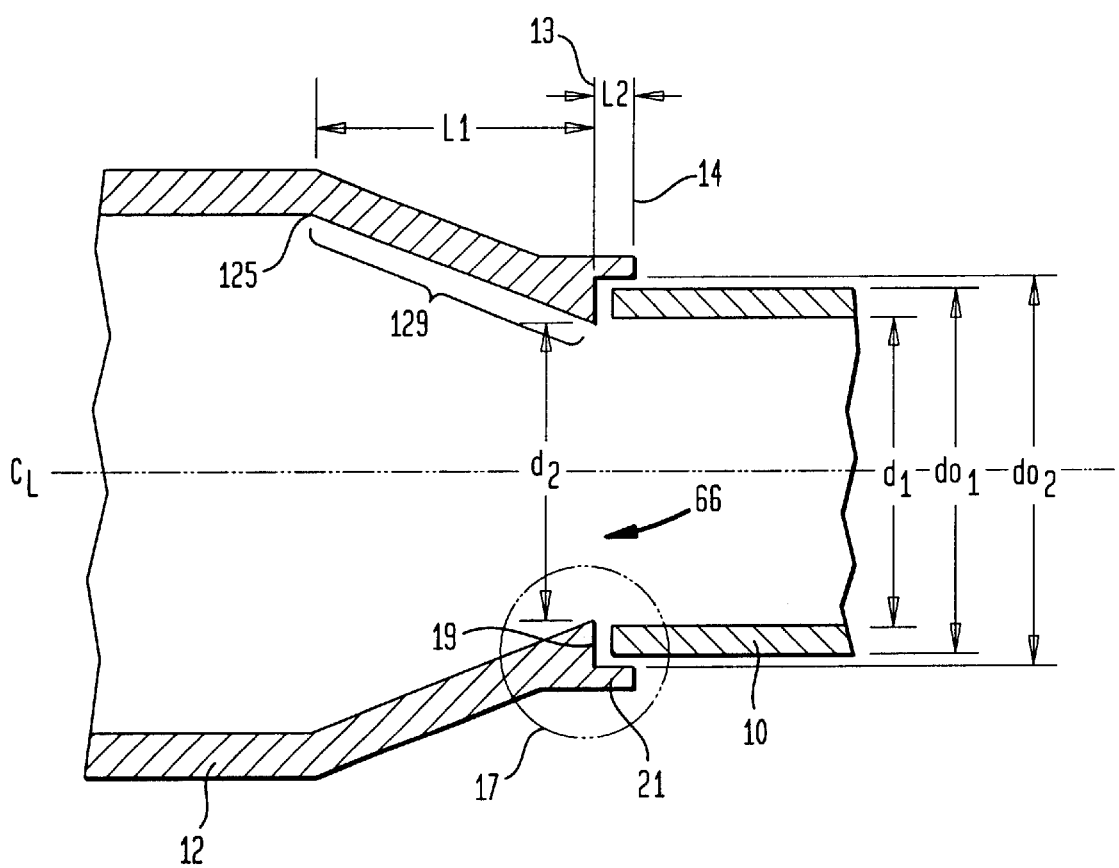
FIG. 2B is an enlarged view of the end section and opening of an exhaust tube, in accordance with the invention.

To ensure that the exhaust tube and the starter tube function as desired, an exhaust tube 12 was designed to have the profile shown in greater detail in FIGS. 2, 2A and 2B. The exhaust tube 12 has a larger inner diameter (dt2) than the inner diameter (d1) of the starter tube 10, except at, and near, point 13 where the exhaust tube 12 mates with the starter tube 10. The larger diameter of the exhaust tube 12 ensures that its cross sectional area will be greater than that of the starter tube to enable the exhaust gas and vapors to escape from the starter tube with little, if any, turbulence. Also, any deposition of gases and vapors along the inner walls of the exhaust tube, particularly in the region L1, will not result in a narrowing of the inner walls which would block the passage of any escaping gases and reactants before the starter tube is completely filled.

Referring to FIG. 2, note that the exhaust tube 12 is a hollow, cylindrical, glass tube with an inner diameter dt2 from point 125 extending leftward to exhaust end 15. Starting at point 125 and extending rightward for a distance "L1", until a first point 13 of tube 12, the inner diameter of tube 12 is gradually reduced. Thus, over a distance "L1" starting from point 125 and ending at point 13, the inner diameter of tube12 decreases from its nominal value (dt2) until, at point 13, its inner diameter has a value, d2, which is approximately equal to the inner diameter (d1) of starter tube 10. At the point 13, the contact surface of exhaust tube 12 mates with the end surface of starter tube 10. At point 13 the inner diameter of exhaust tube 12 is made approximately equal to the inner diameter of the starter tube 10. That is, if the inner wall of the starter tube were extended it would be flush with the inner wall of tube 12, at and about the "mating" line 13

Note that along the length "L1" of the end section 121 of exhaust tube 12, a curve or taper is imparted to the inner and outer walls of the exhaust tube 12 to cause the inner diameter of the exhaust tube 12 to go smoothly from a value of "dt2" to a smaller value "d2" which is substantially equal to the inner diameter "d1" of tube 10. By way of example, dt2 is approximately 2 inches, while d1 and d2 are approximately 1 inch. In FIG. 2, the section L1 is shown to have a conic shape, however, it should be appreciated that this portion could be parabolic, elliptical, concave or convex, so long as the inner contour is free of discontinuities.

The end section of tube 12, beginning at point 125, and the opening (mouth) 66 of tube 12 are shaped to accommodate tube 10. Thus, as shown in FIGS. 2A and 2B, the rim region 17 of exhaust tube 12, extending between cross line 13 and end point 14, is specially shaped to accomplish several functions. Over a length "L2", beginning at line 13 and extending until the end edge 14 of tube 12, the inner diameter of tube 12 is increased to accommodate the insertion of tube 10. The inner diameter of tube 12 is increased from a value of d2=d1, at point 13, to a value which is slightly greater than $d_o1$, at end point 14; where d1 and $d_o1$ are, respectively, the inner and outer diameters of starter tube 10. The increase in the dimension of the opening of tube 12, between points 13 and 14, is just enough to ensure that tube 10 can be "snuggly" inserted into tube 12 and to ensure that both tubes, when mated, have a common center line.

Note that, decreasing the inner diameter of tube 12 from point 125 to point 13 and then increasing the inner diameter of tube 12 from point 13 until the end edge 14, produces a "stop" within tube 12 (along line 13) which prevents the starter tube from being inserted into tube 12 past "cross line" or point 13. As shown in FIGS. 2, 2A and 2B, along line 13, within tube 12, there is formed an L-shaped ledge (and/or lip), 19, at mating surface 13 so that the end face of starter tube 10 and the contact surface of exhaust tube 12 can be nested and joined with each other, while preventing tube 10 from penetrating past surface 13 into tube 12. As shown in the figures, between points 13 and 14, the outer wall of exhaust tube 12 includes an extension 21 (also identified as 21a, 21b) which extends beyond ledge 19 for a distance "L2". Along the length L2, the extensions 21a, 21b, are shaped such that the inner diameter of tube 12 is just a little greater than the outer diameter of tube 10. This ensures that tube 10 can be inserted "snuggly" within the opening of tube 12 for a distance of approximately L2.

As further discussed below (regarding FIG. 6) when heat of fusion is supplied to the regions L1 and L2 of tube 12 after the insertion therein of tube 10, the side extensions 21a, 21b, of tube 12 melt and "collapse" about tube 10, thereby fusing/joining tubes 10 and 12 to form a unitary combined component, referred to herein as a "preform". Concurrently, the end surface of tube 10 and the contact surface 19 of tube 12 m2lt and join together. The cross section of the exhaust tube profile is also shaped so as to provide a sufficient amount of "flowable" material within extension 21a, 21b which fuses into a smooth walled inner diameter joint (between lines 13 and 14) upon completion of the heating (joining and/or fusing) process. That is, the inner walls at the interface of the starter and exhaust tubes are smooth and have the desired diameter, after the two have been joined or fused.

Region 17 defines a self-centering joint between tubes 12 and 10. This "self-centering" and "self-nesting" joint enables the starter and exhaust tubes to have a common center line, as shown in FIGS. 1B and 2. In the embodiments shown herein, the shape of the mating end (between lines 13 and 14) of the exhaust tube is modified to enable the exhaust tube to mesh, or nest, easily with the starter tube. Alternatively the shape of the starter tube could be modified. However, in the manufacture of fiber optic fibers, it is preferable that the diameter of the starter tube be kept constant and uniform over its full length to obtain the desired optic fiber quality. Therefore, only the shaping of the exhaust tube is discussed, even though the other possibility exists.

In FIG. 2, the rim portion 17 at the mating edge end of exhaust tube 12 is shown as an L-shaped ledge, or lip, 19, with an extension 21a, 21b. However, it should be noted that the inner opening or rim of tube 12 (i.e., the wall of the exhaust tube, between its inner and outer diameter over the length "L2") may have other shapes to ensure self-nesting between the exhaust and starter tubes. That is, the inner wall of tube 12, between points 13 and 14, may be shaped to have different forms to enable the starter tube to mesh and nest with the exhaust tube so that they both will have the same center line and to enable the two tubes to be joined and fused together easily.

Applicants' invention is also directed to the molds for shaping one end of the exhaust tube so it can mate with a starter tube. The molds enable the fabrication of exhaust tubes having consistently reproducible shapes and characteristics. In addition to providing a desired shape, molds embodying the invention function to control certain critical dimensions of the exhaust tubes formed with the molds. Thus, molds embodying the invention enable the forming of exhaust tubes having more consistent dimensions and fewer defects and capable of nesting or mating with a starter tube.

Figure 3A:
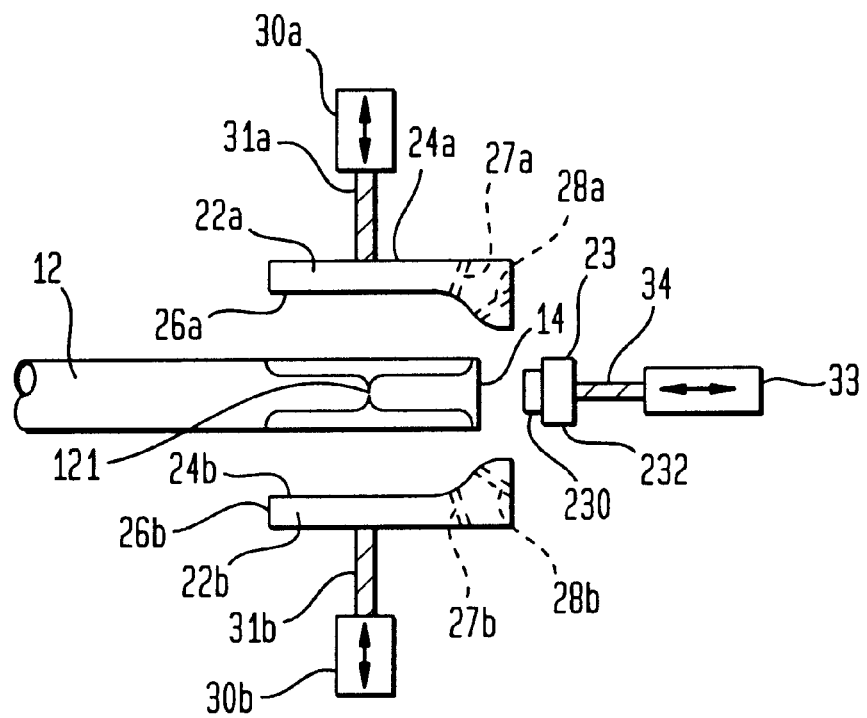
FIG. 3A is a cross section of a three (3) piece mold embodying the invention for shaping one end of an exhaust tube in accordance with the invention.

The shapes and functions of molds embodying the invention and their application to exhaust tubes are shown in FIGS. 3A, 3B, 4A, 4B, 4C and 4D. In FIG. 3A there is shown a simplified cross sectional diagram of a 3-piece mold which is about to be applied to a hollow cylindrical tube 12. In FIGS. 3B, 4A, 4B and 4C, the tube is shown as shaped by the mold. The 3-piece mold includes elongated side sections 22a, 22b and an end plug, or cap, 23. The side sections 22a and 22b are applied along an end section 121 of tube 12, extending from a point 127, past the bending point 125, the stop line 13 and past the end 14 of tube 12. The side sections impart a smooth taper to the end section of the tube 12 and reduce its inner diameter gradually such that at a point 13, the inner diameter of tube 12 matches that of starter tube 10, intended to be mated with tube 12. The resulting end section of tube 12 may be generally characterized as an oblate cone like section. The end plug 23 includes a solid cylindrical stub 230 and an end cap section 232. The solid cylindrical stub section 230 is inserted into the orifice 66 at the selected end of hollow cylindrical tube 12 to shape the rim of the tube and to prevent the inner diameter of the tube 12 from decreasing below a predetermined value (e.g., approximately d1 of the mating starter tube). The solid cylindrical section 230 of plug 23 also has two sections (231, 233) of different size, whereby a step (see FIGS. 4A, 4B and 4D) is formed between the two sections. The step causes a ledge (lip or groove) 19 to be produced within the inner surface of tube 12 (at point 13) while the portion of the tube squeezed between the inner surfaces of mold pieces 22a, 22b and the outer surface of the cylindrical stub 230 results in extensions 20, 20b between lines 13 and 14, as shown for section 17 in FIGS. 2, 2A and 2B. The end cap section 232 functions to effectively seal the end of tube 12. The application of the 3 mold pieces, 22a, 22b and 23, to a selected end of tube 12, after it has been rendered malleable, causes tube 12 to assume the form shown in FIGS. 1, 2, and 3B.

FIG. 3A also shows that the two side pieces of the mold, 22a and 22b, are held by mechanical holding arms 31a, 31b, which may be selectively activated by air cylinders 30a, 30b, to cause the application and/or retraction of the side molds 22a, 22b to, or from, the cylindrical tube 12. The end plug, or cap, 23 of the mold is also held by a mechanical arm 34 which is coupled to air cylinder 33. When air cylinder 33 is activated, the end plug 23 is inserted into the tube end 14. The two side pieces of the mold may originally be part of a unitary sleeve-like structure which is cut (sawed) in half (or in a different ratio) to produce the two halves 22a, 22b. The outer periphery of the two side pieces as well as the outer periphery of plug 23 may include studs or holding holes or posts to enable holding arms 31a, 31b and 34 to securely hold and apply their respective mold section.

Figure 3B:
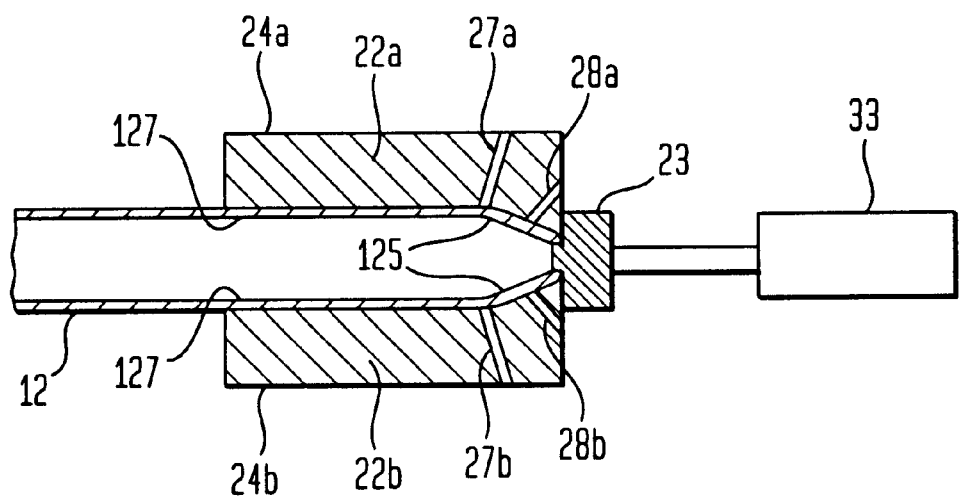
FIG. 3B is a cross section of a three (3) piece mold embodying the invention applied to one end of an exhaust tube for shaping it in accordance with the invention.

FIG. 3B is a simplified cross sectional diagram showing the general shape of tube 12 after the mold pieces have closed-in on the tube. The side pieces, 22a and 22b, extend along the length 121 of cylindrical tube 12 and impart a smooth taper along the length of the tube beginning at a point 125 and continuing to the end 14 of the tube. When joined together, the inner surfaces of side pieces 22a, 22b define an oblate cone-like shape. In their application, the side pieces extend from a point 127 along the tube 12 (rightward in FIGS. 3A and 3B) to the end 14 of the tube and a short distance beyond end 14 to complete shaping the end of tube 12 and receive the end plug 23. The end plug 23 ensures that the shape of the rim and the opening 66 at the mating end of tube 12 are as desired.

Figure 4A:
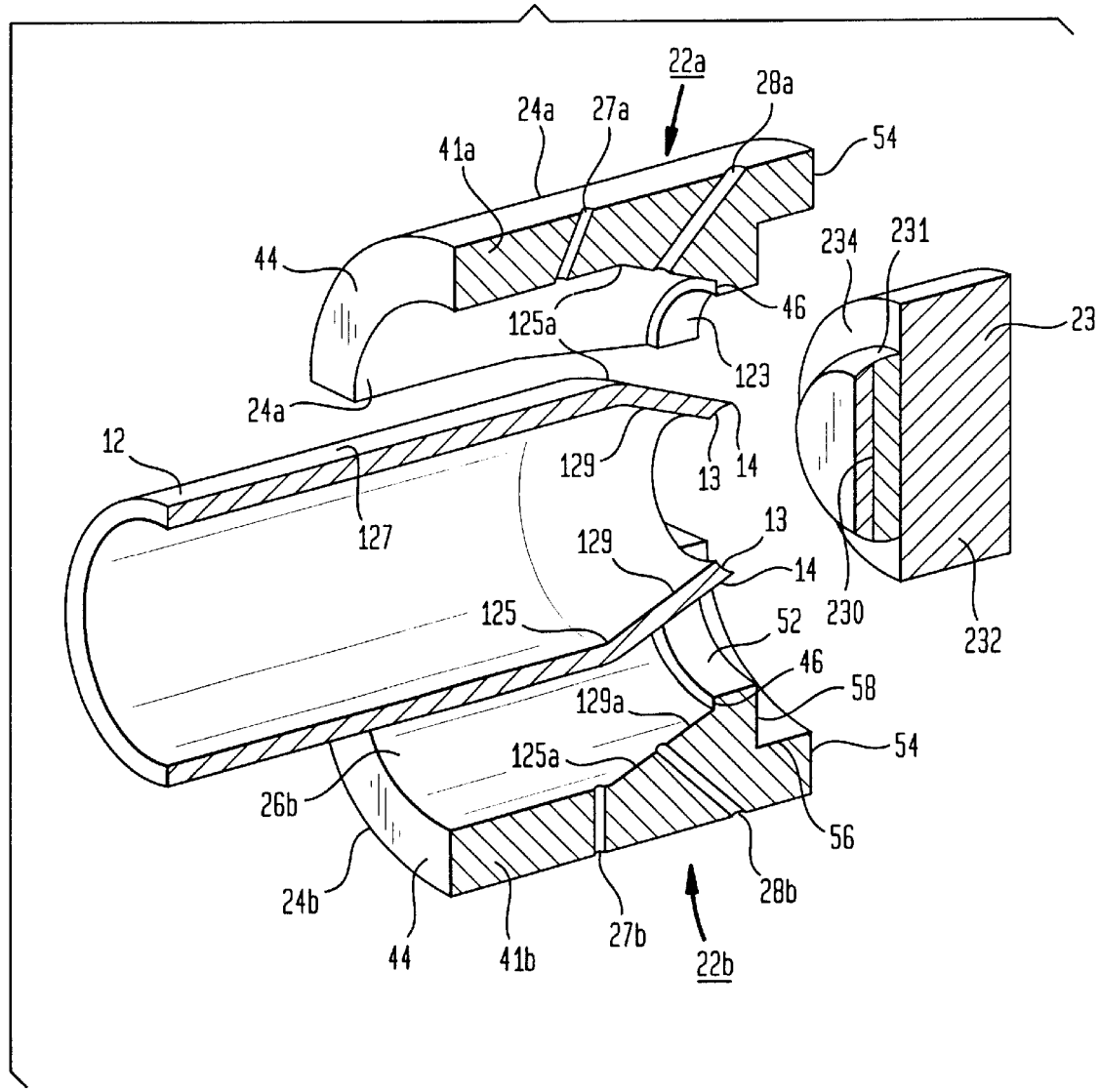
Figure 4C:
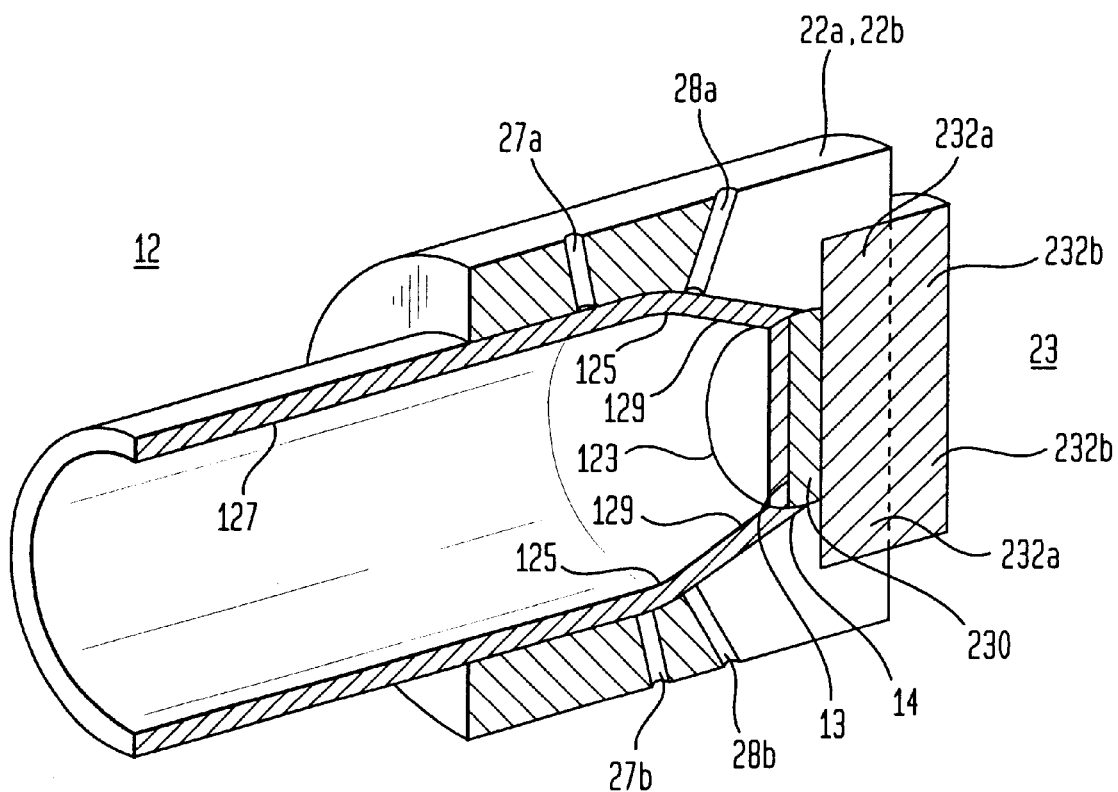
Figure 4D:
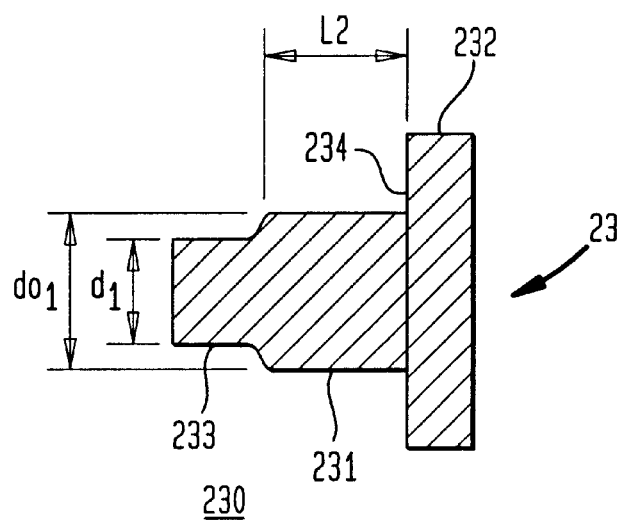
FIG. 4D is a cross section of a mold piece including an end cap and stub.

Various views of the mold pieces are shown in greater detail in FIGS. 4A, 4B, 4C and 4D. FIG. 4A is a break away cross sectional view of tube 12 and the three pieces of the mold, showing how the mold would be applied to tube 12. FIG. 4B is a break away cross sectional view of tube 12, the side mold 22a, and the end plug 23. FIG. 4C is a cross sectional diagram of the mold applied to the tube 12. FIG. 4D is a cross section of a cap with a two-section cylindrical stub. Referring to FIGS. 3A, 3B, 4A, 4B, 4C and 4D, the following features of the molds are noted.

Each one of the "side" mold components 22a and 22b has an outer surface 24a, 24b, and an inner surface 26a, 26b. The two side pieces 22a, 22b, are joined together and encircle the tube along the tail end of the tube extending from a point 127 until the end 14 of tube 12 and then past the end of tube 12. The inner surfaces of the side mold pieces are concentric for a length extending from point 127 until a bending point 125. Bending point 125 may be, for example, 2 to 4 inches from point 127, and approximately 1 inch from the selected end 14 of the tube.

From point 125 until the edge 123 (corresponding to edge 13 on tube 12), the inner surfaces of the side pieces 22a, 22b, taper down, conically, while leaving an opening 66a at the end of the mold (which also forms opening 66 in tube 12). At the point 123 on the inner surfaces of the mold (corresponding to edge 13 of tube 12), the two side pieces, when joined, leave an opening 66a. The opening 66a needs to be sufficiently large to ensure that the inner diameter of the "shrunken" exhaust tube at point 13 is approximately equal to the inner diameter of starter tube 10 while the outer diameter of tube 12 between lines 13 and 14 is just a little larger than the outer diameter of starter tube 10. This enables the starter tube to be inserted "snuggly" into the opening of tube 12.

The two elongated side pieces 22a, 22b are complementary to each other and are intended to be joined along walls, 41a, 41b, so as to encircle tube 12 along its length, near its end 14 (the right hand side in the figures). The inner surfaces of the two side pieces 22a, 22b extend from a first, or front, end 44 to a second, or back, end 54. The inner surfaces 26a, 26b, of the side molds define two general regions. The first (or front) region is an arcuate cavity 25 which extends from the front end 44 to a ridge 46 for receiving the tube 12 and imparting a conic shape to the end section 121 of tube 12. Each front region of the side pieces 22a, 22b has two sections. The front region extends from the first end 44 to a point 125a and the rear (second) region extends from point 125a to the ridge 46. Within the front region the inner surfaces of the side pieces are cylindrical. Within the second region (from point 125a to ridge 46) the cavity narrows forming a tapered segment 129a. Ridge 46 is bordered by a smooth annular ring 52. The second (or back) region of the inner surfaces 26a, 26b of the molds is for receiving the solid cylindrical stub 230 of end plug 23 which controls the diameter of the end edge of tube 12 and shapes the rim and opening of tube 12. The second region of the side pieces extends from the back end of ridge 46 which is defined by a back wall 58 (facing leftward), which is a smooth annular wall, A ledge 56 extends from back wall 58 to the back end 54 of the mold. When the two elongated side mold pieces 22a, 22b are joined together as shown in FIG, 3B, a circular opening 66a is formed around annular ring 52 corresponding to opening in the rear of tube 12.

As shown in FIGS. 3A, 3B, 4A, 4B and 4C a plurality of ventilation channels 27a, 27b, 28a, 28b, are formed within the molds extending from the inner surfaces 26a, 26b to the outer surfaces 24a, 24b of molds 22a, 22b to enable air and/or gases trapped between the walls of the tube 12 and the inner surfaces of the molds to escape during the molding process.

The end plug (or cap) 23 may be better described with reference to the simplified cross sectional diagram of FIG. 4D. Plug 23 includes an end cap section 232 from which extends (leftwards in the figures) a solid cylindrical stub 230. Solid cylindrical stub 230 has a first section 231 of diameter $d_o1$ and length L2 extending from the "inner" surface 234 of end cap section 232. The stub 230 has a second section 233 extending from the first section 231. The second section 233 is of diameter d1 and its length is not critical, so long as it is long enough to ensure that the inner diameter of tube 12 at point 13 is established. Thus, end plug 23 ensures that the opening 66 at point 13 of tube 12 is approximately equal to a first value (e.g., d1) and that the inner diameter of the tube along length L2, between point 13 and end edge 14, is just greater than a second value (e.g., $d_{o1}$) to form a ledge or lip a distance L2 from the end 14 of tube 12 and to enable a starter tube to nest within the opening of tube 12 and abut against ledge 19. In a particular embodiment, the values of d1 and d2 were equal to 22 millimeters, $d_o1$ was equal to 28 millimeters, $d_o2$ was equal to 29 millimeters, L1 was equal to 25 millimeters and L2 was equal to 5 millimeters and dt2 was approximately 55 millimeters.

End plug (or cap) 23 may be held by a rod 34, or be part of the rod 34 (see FIGS. 3A, 3B). Plug 23 includes a solid cylindrical stub 230 extending from the back cylindrical portion 232 of plug 23. A portion 232a (see FIG. 4C) of back portion 232 is designed to fit within the rear opening formed by the two side pieces, 22a, 22b. The "inner" surface 234 of portion 232a is intended to fit against the wall 58 while resting on ledge 56. The solid cylindrical stub 230 extends through the annular ring 52 and can be inserted within the rear hollow neck of tube 12, to control the inner and outer diameters of tube 12 and the shape of the tube opening in the end region between points 13 and 14. The solid cylindrical stub 230, includes a step 231 extending for a length L2 along the stub from the back plane 234. The step causes the rim of tube 12 to have a desired shape such as the one shown in FIGS. 2, 2A and 2B. In the figures, a step 231 is shown, However, a curve and/or other shaping structure or profile matching structure may be used.

The mold components may be manufactured to close tolerances from materials which can withstand the high temperatures of molten glass. Examples of appropriate materials include cast iron or steel coated with a ceramic or other coating resistant to the high temperatures. It is important that any ceramic coating used will not contaminate the glass products being manufactured.

Certain mold configurations have been shown, but it should be understood that many variations and modifications may be made without departing from the spirit and scope of the inventive aspects of the molds to shape tubes.

Referring to FIG. 5, there is shown an apparatus for semi-automatically, or automatically, applying the mold pieces to a hollow cylindrical glass tube 12 for shaping a selected end 121 of the tube. Tube 12 is firmly positioned within a central opening 64 of a rotatable chuck 62 of a horizontally mounted controlled speed lathe 60. The lathe 60 supports tube 12 and ensures that tube 12 is rotated at a controlled speed. A heat source 16 is positioned such that the selected end portion, 121, of tube 12 is heated to a temperature of, for example, approximately 2,100 degrees centigrade, which causes the end of the tube to become soft and malleable. The heat source 16 may be an oxygen-hydrogen torch, but any other suitable heat source may be used. The temperature of the heat source applied to the tube can be measured by a pyrometer 80 having an output which can be coupled to control circuitry (see FIG. 9) for controlling the heat supplied to the tube end, 121. The output of pyrometer 80 may also be used to control the application and retraction of the heat source, 16, and the application and retraction of the mold pieces applied to the tail end of the tube 12. The heat source 16 may be moved back and forth via motor 65 which may be controlled by an output from pyrometer 80, or by other means such as an optical sensor (e.g., photosensor 87), or manually, and/or by any other independent or related means.

When the tube segment 121 reaches the desired temperature for forming, the heat source 16 is removed and a multi-part mold (see FIGS. 3 and 4) is applied to the end section 121 of tube 12. FIG. 5 shows (symbolically) that the sections 22a and 22b of the mold are held by mechanical holders 31a, 31b and that the end plug 23 is held by a mechanical holder 34. The mechanical holders are, in turn, coupled to air cylinders 30a, 30b and 33 which control the application of their respective mold portions to tube 12. Air cylinders 30a and 30b control the application and retraction of mold pieces 22a and 22b. Air cylinder 33 controls the application of the end mold piece 23, which may also be referred to as a forming plunger or a roll forming tool. The actuation of air cylinders 30a, 30b and 33 may be controlled by an output from pyrometer 80 and/or by other independent means or by other means such as an optical sensor (e.g., photosensor 87), or manually, and/or by any other independent or related means. As noted above, the mold sections may have holding studs or holes located along their outer surface or along their end faces (e.g., 44,54 for 22a and 22b).

When the tube is heated to the point that it is rendered soft and malleable, the torch 16 may be turned off and/or moved out of the way. The two side sections 22a and 22b of the mold are applied around the periphery of tube 12, along its tail end, for imparting a smooth curve to the tail end of the tube. The two side pieces 22a, 22b, leave an opening at their end, which opening faces the end (or opening) of tube 12. End plug 23 is positioned such that it fits through the opening between the ends of the two side molds, 22a,22b, and end cap 232 seals the opening between the ends of the two side molds. Plug 23 is also inserted within the opening 66 of tube 12 for shaping the rim of tube 12 and ensuring the proper dimensioning of the inner and outer diameters of tube 12 in the region 13,14, as discussed above. Thus, the end piece 23, in combination with the side mold pieces, 22a,22b, imparts an L-shaped lip (or ledge) to the inner rim of tube 12 and also controls the inner and outer diameters of tube 12, to enable a starter tube to "nest" and/or mate within the opening of the exhaust tube 12.

During the heating and molding of tube 12, positive air pressure from a source 82 is applied via tubing 84 to the one end 131 of tube 12 which is not being shaped. The positive pressure supplied within the tube 12 causes its walls to push back against the mold and to conform more exactly to the shape being imparted by the pieces of the mold. Air escapes from within the mold system cavity through a plurality of ventilation channels (27,28) in the side mold pieces. After the tube is formed and the system has stabilized, the mold pieces are retracted from the tube, the air pressure is discontinued and the exhaust tube is allowed to cool. That is, after the mold pieces have been applied for a predetermined period for shaping the exhaust tube, the molding components 22a, 22b, and 23 are retracted to allow the glass tube to cool and to then be removed from the equipment.

The apparatus of FIG. 5, as further detailed with respect to FIG. 9, may be part of a semi-automatic or automatic system for molding and shaping a selected end of the exhaust tube to mate with the starter tube.

Thus, according to one aspect of the invention, exhaust tube 12 may be shaped semi-automatically or automatically, with a simple, closed loop, control system. This eliminates the "art" used in the prior art forming method and replaces it with a method and apparatus for forming tubes having more consistent form dimensions, with fewer defects and fewer unusable products. Consequently, the manufacture of exhaust tubes and preforms in accordance with the invention leads to increased productivity in the manufacture of optical fibers.

Thus, in accordance with the invention, glass tubes may be formed which have reproducible dimensions and consistently have the same shape resulting in a reduced number of defective products and eliminating the need for manually forming the glass tubes.

Although a particular embodiment has been described, it is to be understood that the present disclosure is only by way of illustration and that numerous changes in the shape of the tubes and in the construction of the molds may be made without departing from the spirit and scope of this invention.

The apparatus shown in FIG. 6 illustrates the joining/fusing of a starter tube 10 with an exhaust tube 12 formed in accordance with the invention. The exhaust tube 12 is mounted within the chuck of a lathe 60, as shown in FIG. 5. The starter tube 10 is mounted in the opening 74 of a chuck 72 of a lathe 70. Lathes 60 and 70 may be controllably moved laterally along the surface of a bed 75. To aid in the alignment of tubes 10 and 12 adjustable supports 76 and 77 are provided. In addition to being adjustable height wise, these supports 76, 77 may be moved laterally along the surface of bed 75. The supports 76, 77 assist in the alignment of the two tubes; however, unlike in the prior art, the supports are not absolutely necessary since the tubes formed, in accordance with the invention, nest within each other at their mating end. By proper adjustment of the height of chuck 72 and the height of supports 76 and 77, tubes 10 and 12 may be aligned on center. Then, the lathe 70 (or lathe 60) is moved laterally until tube 10 is snuggly and firmly inserted within tube 12, with the end of tube 10 resting against the ledge 19 at line 13 of tube 12, as shown in FIGS. 2 and 2B, above. Due to the shaping of the opening of tube 12, as discussed above, the mating end of starting tube 10 is brought into contact with the mating end of exhaust tube 12, with the starter tube nesting within the corresponding mating end of exhaust tube 12 as detailed above for FIGS. 2, 2A and 2B. Thus, both the exhaust tube 12 and the starter tube 10 are respectively held within the chucks of a first, 60, and second, 70, supporting means as shown in FIG. 6. After the two tubes are properly aligned, they are rotated in synchronism by rotating chucks 62 and 72. Then, a torch 16 is applied to the mating region of the two tubes until their mating ends are fused and/or joined. The starter and exhaust tubes are joined along lip 19 and around the rim (region 13–14) with the glass flowing between the two so that the inner surface going from the starter tube to the exhaust tube is smooth, solid and continuous.

The heat of the torch is sensed by a pyrometer 80 and is well controlled to ensure proper joining/fusion of the two tube ends. When the sealing of the two tubes is completed the torch is retracted. Then, the combined starter tube with the exhaust tube attached is removed from the apparatus, producing a preform having the shape and desired profile shown in FIGS. 1A and 1B.

Figure 7:
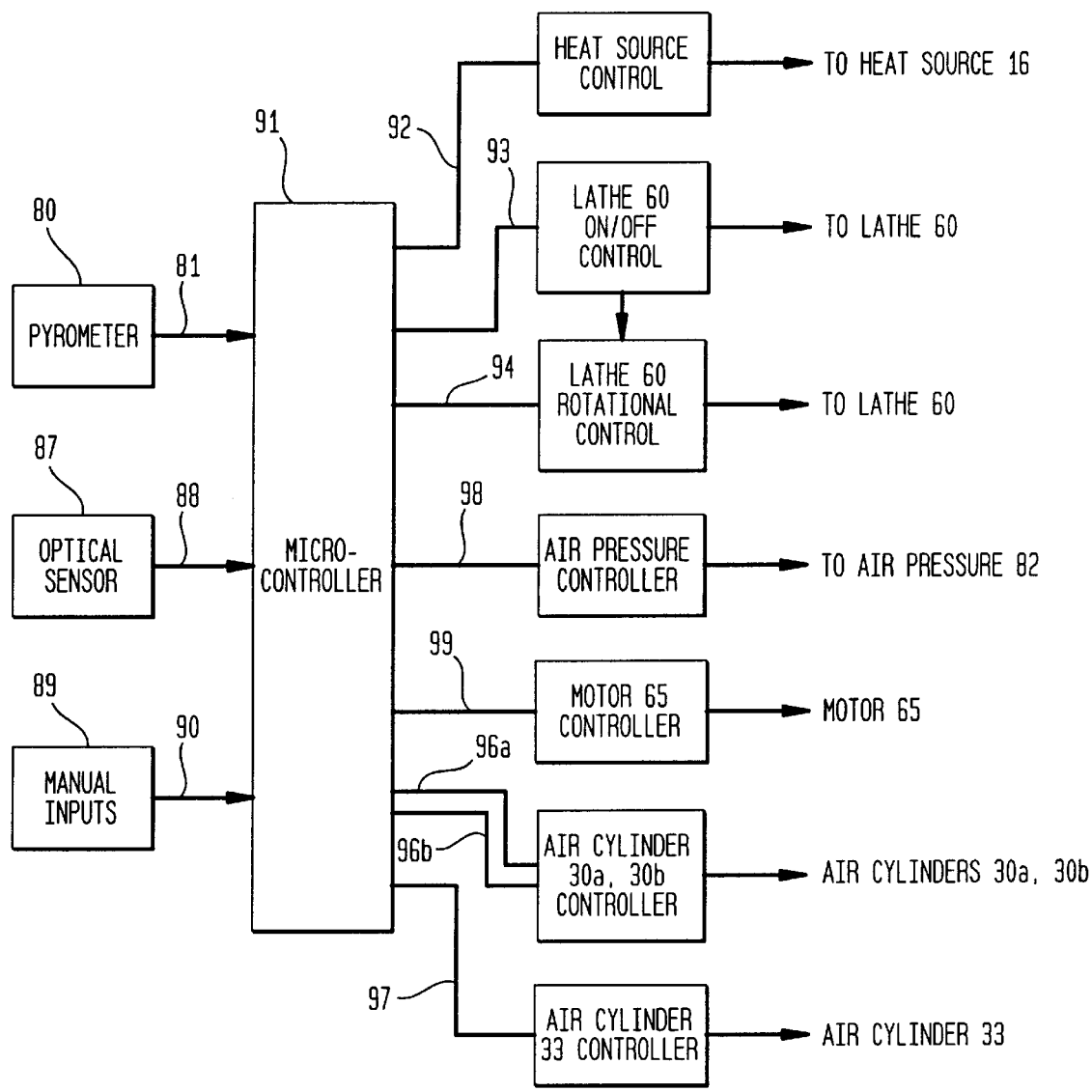
FIG. 7 is a block diagram of control circuitry for operating all or parts of the system of FIGS. 5 and 6.

FIG. 7 is a simplified electrical block diagram of a control system which may be used to operate and control the apparatus of FIGS. 5 and 6. The system includes a microcontroller 91 to which input signals may be applied from a number of different sources. FIG. 7, like FIGS. 5 and 6, shows a pyrometer 80 supplying input signals on a line 81 and an optical sensor 87 supplying input signals via a line 88. FIG. 7 also shows manual inputs 89 (e.g., switch closures) which may be used to apply input signals to controller 91 via a line 90. In response to the various control signals, the controller 91 produces a signal on a line 92 to control the amount of gas supplied to the heat source (16) and hence, the intensity of the heat produced by the heat source (e.g., torch 16 in FIGS. 5 and 6). The controller 91 supplies signals on lines 93 and 94 to control the turn-on and turn-off of the lathe 60 (and/or lathe 70) as well as the rotational speed of the lathe(s). These signals may also control, where necessary, the lateral movement of the lathe, as well as adjusting the height of the chuck or member holding the piece being worked on. The controller also produces signals on output lines 96a, 96b and 97 to control air cylinders 30a, 30b, and 33 to advance and retract the mold components around tube 12 and into tube 12, as it is being molded. The controller 91 also includes an output line 98 for controlling the application of positive air pressure within the tube being shaped. The controller 91 also includes an output 99 applied to the motor 65 for controlling the movement of the torch in FIGS. 5 and 6. The function/action commanded by controller 91 can be sensed by the various optical and temperature sensors shown, enabling closed loop operation.

As is evident from the above, the system allows the shaping of the exhaust tube and/or the mating of an exhaust tube and a starter tube to be done semi-automatically or automatically.

As is also evident from the above, in response to signals from the pyrometer, the microcontroller produces signals controlling the amount of gas being supplied to the torch. The heat supplied by the torch to the tube may be continuously controlled ensuring that neither too much nor too little heat is applied. The microcontroller can also sense the length of time for which the heat is applied to ensure that the tube portion being heated is heated to a malleable condition.

Also, though not shown in detail, optical sensors (e.g., photosensor or laser sensors or any suitable viewing device) may be used to sense the condition of the tube section being heated and provide a signal indicative of the condition of the tube (i.e., whether it has reached a sufficient degree of softness to be malleable). When the tube is found to be malleable, a signal may be fed to control the heat source and the application of the molds for shaping, as described above.

Certain mold and system configurations have been shown, but it should be understood that many variations and modifications may be made to the molds and to the system without departing from the spirit and scope of the invention.

What is claimed is:

1. A mold for shaping the end region and the opening at a selected end of a hollow cylindrical tube used in the manufacture of optic fibers comprising:

two complementary elongated side pieces having inner surfaces for, when joined, encircling the periphery of the tube along the length of its end region at its selected end;

an end cap with a cylindrical stub for insertion within the opening of the tube at the selected end; and the two elongated side pieces and the end cap stub being shaped, and cooperating, for causing a gradual tapering and narrowing of the inner diameter of the tube, when the tube is rendered malleable, from a first point to a second point along the tube, where the first point is at a distance, L1 plus L2 from the selected end of the tube and the second point is at a distance L2 from the selected end of the tube; whereby the first point is further away from the selected end of the tube than the second point; and the cap stub extending within the tube from the selected end a distance approximately equal to L2, and, when the tube is rendered malleable, the cap stub and the two side pieces causing an enlargement of the inner diameter of the tube from the second point until the selected end of the tube; the inner diameter of the tube at said second point being approximately equal to, but no less than, a first value and the inner diameter of the tube between the second point and the end of the tube being approximately equal to, but no less than a second value; where said second value is greater than said first value and wherein the inner diameter of the tube at said first point is greater than said second value.

2. A mold as claimed in claim 1, wherein the inner surfaces of the two elongated side pieces, when joined together, have inner surfaces defining an arcuately shaped space for encircling and tapering the end region at, and near, the selected end of the tube for causing the end region to assume a conic shape; and the two elongated side pieces leaving an opening aligned with the tube opening for the insertion of the end cap stub through the opening between the two side pieces and into the tube opening.

3. A mold as claimed in claim 2, wherein the cylindrical stub is solid; and wherein the cylindrical stub has first and second sections, the first section, extending directly from an inner surface of the end cap, has a diameter which is approximately equal to the second value, the first section for being inserted within the tube, a first distance from the end of the tube, and the second section, extending from the first section, beyond the first distance, has a diameter which is approximately equal to said first value.

4. A mold as claimed in claim 2, wherein the hollow cylindrical tube is a glass tube; wherein the mold is applied to the glass tube when the end region is heated to its melting point; and wherein the pieces of the mold are formed of material capable of operating at temperatures in excess of the melting point of glass and without contaminating the glass.

5. A mold as claimed in claim 3, wherein said hollow cylindrical tube is a first tube; and said mold pieces are shaped to enable a second hollow cylindrical tube whose inner diameter is equal to said first value and whose outer diameter is equal to said second value to be inserted with a tight fit a first distance within said first tube, and wherein the inner diameters of said first and second tubes are flush with each other at, or near, the second point.

6. A mold as claimed in claim 3, wherein along said first distance, the wall of the tube is squeezed between a rear portion of said elongated side pieces and the first section of said stub.

7. A mold for shaping the end region and the opening at a selected end of a hollow cylindrical glass tube used in the manufacture of optic fibers, when the end region of the tube is rendered malleable, comprising:

two complementary elongated side pieces having inner surfaces for application to the periphery and along the length of the end region at the selected end of the tube;

an end cap with a cylindrical stub for insertion within the opening of the tube at the selected end;

said side pieces and said cylindrical stub for shaping the tube when the tube is rendered malleable;

the inner surfaces of the two elongated side pieces, when joined together, defining an arcuately shaped space for encircling and tapering the end region of the tube from a first point to a second point from the end of the tube, where the first point is a distance L1 plus L2 from the end of the tube and the second point is a distance L2 from the end of the tube; whereby the inner diameter of the tube is narrowed gradually in going from the first point, farthest from the end, to the second point nearest to the end of the tube; said side pieces leaving an opening aligned with the tube opening for the insertion of the end cap stub through the opening between the two side pieces and into the tube opening; and the end cap stub extending from the end of the tube for a distance at least equal to L2 and being shaped such that, when inserted into the opening of the tube, the stub causes the inner diameter of the tube to have no less than a second value ($d_{o1}$) for a first distance from the edge of the tube and it prevents the narrowing of the inner diameter of the tube at the second point from being less than a first value (d1); where the second value is larger than the first value.

8. A mold as claimed in claim 7, wherein the cylindrical stub has first and second sections, the first section having a diameter of second value, extends from an inner surface of the end cap and is designed to be inserted within the tube, said first distance from the end of the tube and the second section of the stub, having a diameter of said first value, said second section extending from the first section, beyond the first distance.

9. A mold as claimed in claim 8 wherein the diameter of said stub decreases from said second value to said first value a first distance from the inner surface of the end cap causing a step in the stub, which step is correspondingly imparted as a ledge to the inner diameter of the tube a first distance from the edge of the tube.

10. A mold as claimed in claim 9, wherein said hollow cylindrical glass tube is a first tube and wherein a second glass tube is intended to be inserted with a tight fit within the opening of the first tube where, except at the joining interface, the inner and outer diameters of the second tube are, respectively, smaller than the inner and outer diameters of the first tube; wherein the second tube is a starter tube and the first tube is an exhaust tube, and wherein the two elongated side pieces and the stub of the end cap shape the opening of the exhaust tube to enable the starter tube to fit snuggly within the exhaust tube opening up to said ledge; said ledge preventing the starter tube from being inserted deeper into the exhaust tube.

11. A mold as claimed in claim 9, wherein the diameter of the second section of the stub is such that the inner surfaces of the exhaust and starter tubes are flush with each other.

12. A mold as claimed in claim 9, wherein the pieces of the mold are formed of material capable of operating at temperatures in excess of the melting point of glass and without contaminating the glass.

13. A mold as claimed in claim 9 wherein the elongated side pieces of the mold include ventilation channels formed between the inner and outer surfaces to enable gases trapped between the outer wall of the tube and the inner surfaces of the mold to escape.

14. A multi-piece mold for shaping the end region and the opening at a selected end of a first, hollow, generally cylindrical, glass tube to mate with a second tube, of smaller diameter than the first tube, and to enable the second tube to be inserted a first distance within the opening of the first tube at its selected end, comprising:

two elongated sleeve-like pieces of the mold having inner surfaces which, when joined, encircle the outer periphery of the end region of the first tube for gradually reducing the inner and outer diameters of the first tube along the end region proximal to the mating end; and a third piece of the mold comprising an end plug having an inner face with a cylindrical stub extending from the inner face of the plug, the stub for insertion into the opening of the first tube at its selected end, the stub having first and second sections, the first section of the stub, extending directly from the inner face of the plug, having a diameter of first value for a first distance, and the second section of the stub extending from the first section having a diameter of second value; and, when the tube is rendered malleable, the two sleeve-like pieces and the plug cooperating to squeeze the rim of the tube between the two side pieces and the first section of the stub along said first distance such that the inner diameter of the first tube, for a first distance from the edge of the first tube, has a second value which is slightly greater than the outer diameter of the second tube and, the three pieces of the mold causing a narrowing of the inner diameter of the first tube at the first distance from the edge, for preventing the second tube from being inserted deeper into the first tube than said first distance.

15. A multi-piece mold as claimed in claim 14 wherein said cylindrical stub is solid.

16. A multi-piece mold as claimed in claim 15, wherein the stub has a step at the point between its first and second sections imparting a corresponding complementary ledge in the inner wall of the tube, said first distance from its selected end.

17. A multi-piece mold as claimed in claim 15 wherein the diameter of the cylindrical stub has a first value in said first section and a second value in said second section, the diameter in said second section being less than that in said first section.

18. A multi-piece mold as claimed in claim 15 wherein the diameter of the stub in said second section ensures that the inner surfaces of the first and second tubes are flush at said first distance from the edge.

19. A multi-piece mold as claimed in claim 15 wherein said first tube is an exhaust tube and said second tube is a starter tube, with the exhaust tube end surface being shaped such that the first and second tubes can be joined easily at their mating ends.

20. A multi-piece mold as claimed in claim 15 wherein the elongated sleeve-like pieces of the mold include ventilation channels formed between the inner and outer surfaces to enable gases trapped between the outer wall of the tube and the inner surfaces of the mold to escape.

21. A mold for shaping the end region and the opening at a selected end of a hollow cylindrical tube when the selected end region of the tube is rendered malleable, comprising:

two complementary elongated side pieces having inner surfaces for application to the exterior and along the length of the end region of the tube at, and near, the selected end;

an end cap with a cylindrical stub extending from the end cap for insertion within the opening of the tube at the selected end;

the inner surfaces of the two elongated side pieces, when joined together, defining an arcuately shaped space for encircling and tapering the end region of the selected end for causing it to assume a conic shape, while leaving an opening, between the two elongated side pieces aligned with the tube opening for the insertion of the end cap stub through the opening between the two side pieces and into the tube opening; and the cylindrical stub having first and second sections; the first section, extending directly from the end cap, having a diameter d1 and length L2, and the second section, extending beyond the first section, having a diameter d2, with d2 being smaller than d1; whereby when the stub is inserted into the opening of the tube, it causes: a) the inner diameter of the tube to be no less than d1 for a first distance, L2, from the edge of the tube; and b) after the first distance, it allows a narrowing of the inner diameter of the tube, but it simultaneously prevents the inner diameter of the tube at L1 from being less than d2.

22. A mold as claimed in claim 21, wherein the cylindrical stub is a solid cylindrical stub; and wherein the end cap having an inner surface for application against the ends of the elongated side pieces, extending beyond the edge of the selected tube end, so as to seal the opening between the two elongated side pieces.

23. A mold as claimed in claim 21, wherein said hollow cylindrical tube is a first tube; and wherein said first tube is to be joined to a second tube wherein the two elongated side pieces and the stub of the end cap shape the opening of the exhaust tube to enable the starter tube to fit snuggly within the exhaust tube opening until the distance L2; said narrowing at the first distance preventing the starter tube from being inserted deeper than L2 into the exhaust tube.

24. A mold as claimed in claim 21, wherein the diameter of the second section of the stub is such that the inner surfaces of the exhaust and starter tubes are flush with each other.

25. A mold as claimed in claim 21, wherein there is a step between the first and second sections of the stub, whereby a ledge is generated within the tube at said distance L2 from the edge of the tube.

26. A mold as claimed in claim 21, wherein the pieces of the mold are formed of material capable of operating at temperatures in excess of the melting point of glass and without contaminating the glass.

27. A mold as claimed in claim 23 wherein the two elongated side pieces and the stub squeeze the walls of the tube along the first distance, to shape the opening and rim of the tube, whereby, when heated, the rim of the exhaust tube is easily fused to the adjoining walls of the starter tube.

28. A mold as claimed in claim 21 wherein the two complementary elongated side pieces of the mold include ventilation channels formed between the inner and outer surfaces to enable gases trapped between the outer wall of the tube and the inner surfaces of the mold to escape.

29. A multi-piece mold for shaping end section and the opening at a selected end of a first, hollow, generally cylindrical, glass tube to enable a second tube, of smaller diameter than the first tube, to be inserted a short distance within the opening at the selected end of the first tube, comprising:

two elongated sleeve-like pieces of the mold having inner surfaces which, when joined, encircle the exterior end portion of the first tube for imparting a conic taper to the first tube along the selected end portion, whereby the inner and outer diameters of the first tube are reduced; and a third piece of the mold including an end plug having an inner surface with a cylindrical stub extending from the inner surface for insertion into the opening of the first tube at its selected end, the stub having a first portion abutting said inner surface and having a second portion extending from the first portion, the stub when inserted into the opening of the first tube causing the inner diameter of the first tube, for a first distance from the edge of the first tube, to have a second value which is slightly greater than the outer diameter of the second tube and, at the first distance from the edge of the tube, for preventing the second tube from being inserted deeper into the first tube than said first distance from the edge.

30. A mold as claimed in claim 29 wherein the diameter of the cylindrical stub has a first value in said first portion and a second value in said second portion, the diameter in said second portion being less than that in said first portion.

31. A mold as claimed in claim 29 wherein the diameter of the stub in said second portion ensures that the inner surfaces of the first and second tubes are flush at said first predetermined distance from the edge.

32. A mold as claimed in claim 29 wherein said first tube is an exhaust tube and said second tube is a starter tube, with the exhaust tube end surface being shaped such that the first and second tubes can be joined easily at their mating ends.

33. A multi-piece mold for shaping a selected end region of a cylindrical tube and concurrently shaping the opening at the selected end region of the tube, when the selected end of the tube is heated to the point that it is malleable, comprising:

first and second components of the mold having inner surfaces for tapering a length of the tube extending from the edge of the selected end of the tube; said first and second components, when joined, encircling the selected end region of the tube while leaving an opening between the two components in line with the opening of the tube at the selected end region; and a third piece of the mold comprising an end plug including a cylindrical stub for insertion through the opening between the first and second components and into the opening of the selected tube end for shaping the rim and opening of the selected end of the tube.

34. Apparatus for shaping a selected end region of a first cylindrical tube used in the manufacture of optic fibers, when the selected end region of the tube is heated to the point that it is malleable, comprising:

a mold having first and second side pieces for tapering a length of the tube extending from the edge of the selected end region of the first tube and having a third end piece for shaping the rim and the opening of the selected end of the first tube; and the first and second pieces of the mold for being applied around the outer periphery of the first tube and extending from the one end of the first tube a predetermined distance along the length of the first tube; said first and second side pieces imparting a smooth reducing curve to the first tube with the end face of the first tube having a smaller diameter than the portion of the first tube distal from the end; said first and second side pieces leaving an opening at their end corresponding to the end of the first tube; and the third, end, piece of the mold including a cylindrical stub for being applied within the opening of the first tube for enlarging the inner diameter of the first tube along a first distance from the end of the tube and for creating a lip functioning as a stop in the rim region of the first tube at a distance corresponding to said first distance, between the inner and outer walls of the first tube, said enlarging of the inner diameter and said lip for enabling a second tube to be fitted within the first tube and to be easily located on the same centerline as the first tube and for preventing said second tube from going beyond said first distance.

35. A multi-piece mold comprising:

two side pieces of the mold having inner surfaces, designed to be applied along the length of a cylindrical tube and encircling the tube, for tapering and narrowing the end section of the cylindrical tube for a first distance from the end of the tube; and the mold including a third piece comprising an end cap with a cylindrical stub for, in conjunction with the two side pieces, shaping the rim and the opening of the cylindrical tube.

* * * * *